Jan. 23, 1962  A. A. KEYES  3,017,732
COTTON TOPPER
Filed Sept. 4, 1959  3 Sheets-Sheet 1

Andy A. Keyes
INVENTOR.

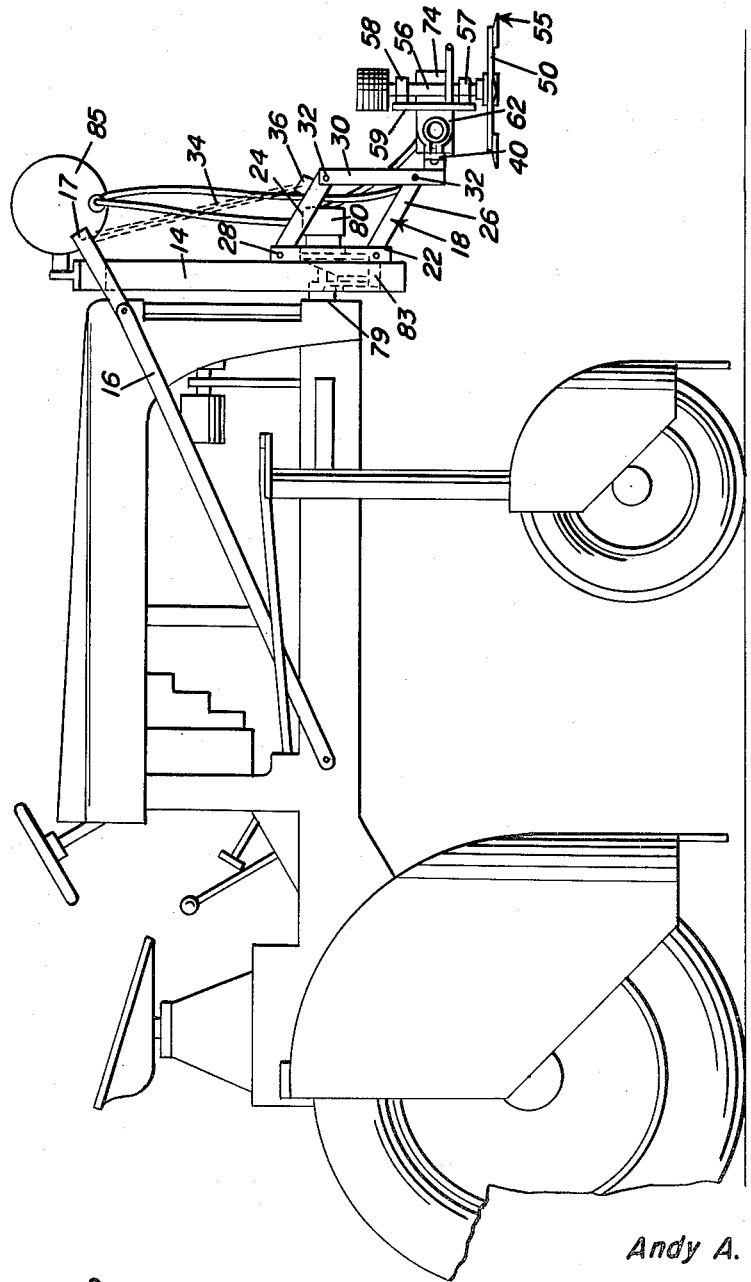

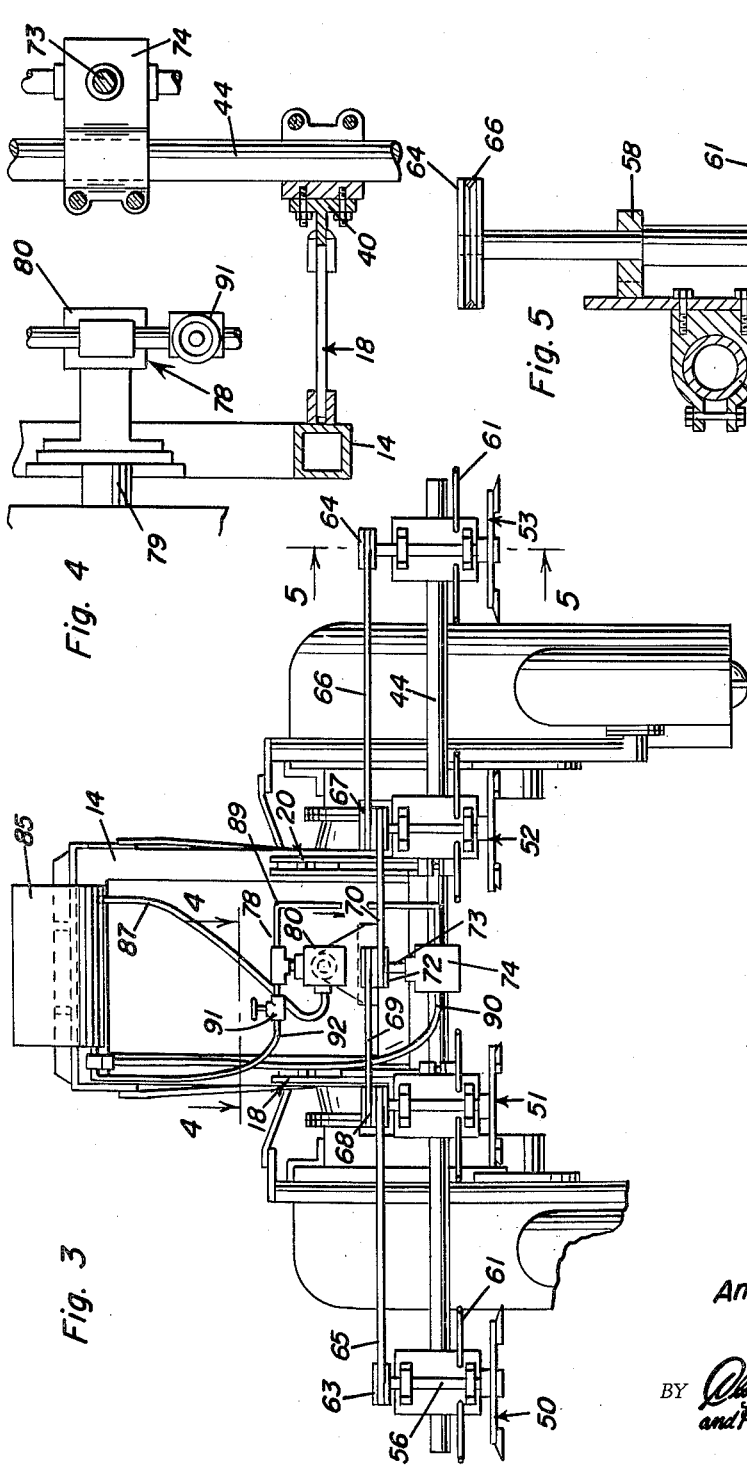

United States Patent Office 3,017,732
Patented Jan. 23, 1962

3,017,732
COTTON TOPPER
Andy A. Keyes, 895 S. 15th St., Raymondville, Tex.
Filed Sept. 4, 1959, Ser. No. 838,133
3 Claims. (Cl. 56—25.4)

This invention relates to farm equipment and more particularly to a hydraulic cotton topper.

An object of the invention is to provide a tractor attachment for topping cotton at any predetermined height.

Briefly, the tractor attachment is mechanically very simple in construction and can be secured to any conventional tractor at the front thereof. An important feature of the invention is the hydraulic operation of the cutters, making them positive in their action and dispensing with belting, shafting, etc., taxing only the hydraulic system applied on the tractor.

The attachment is made of a frame secured to the front part of the tractor and on which there is a linkage supporting a beam extending transversely across the front of the tractor. A number of bearing mounts are connected to the beam, and each supports a vertical spindle driven by the hydraulic power system. A knife is connected with the spindle so that upon actuation of the hydraulic motor system of the attachment, the cutters or knives are rotated for topping the cotton in advance of the tractor as the tractor is moved through a cotton field.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side view of the tractor and attachment in FIGURE 1.

FIGURE 3 is a fragmentary front view of the tractor and attachment.

FIGURE 4 is an enlarged sectional view taken on the line 4—4 of FIGURE 3.

FIGURE 5 is a sectional view taken on the line 5—5 of FIGURE 3.

Figure 1:
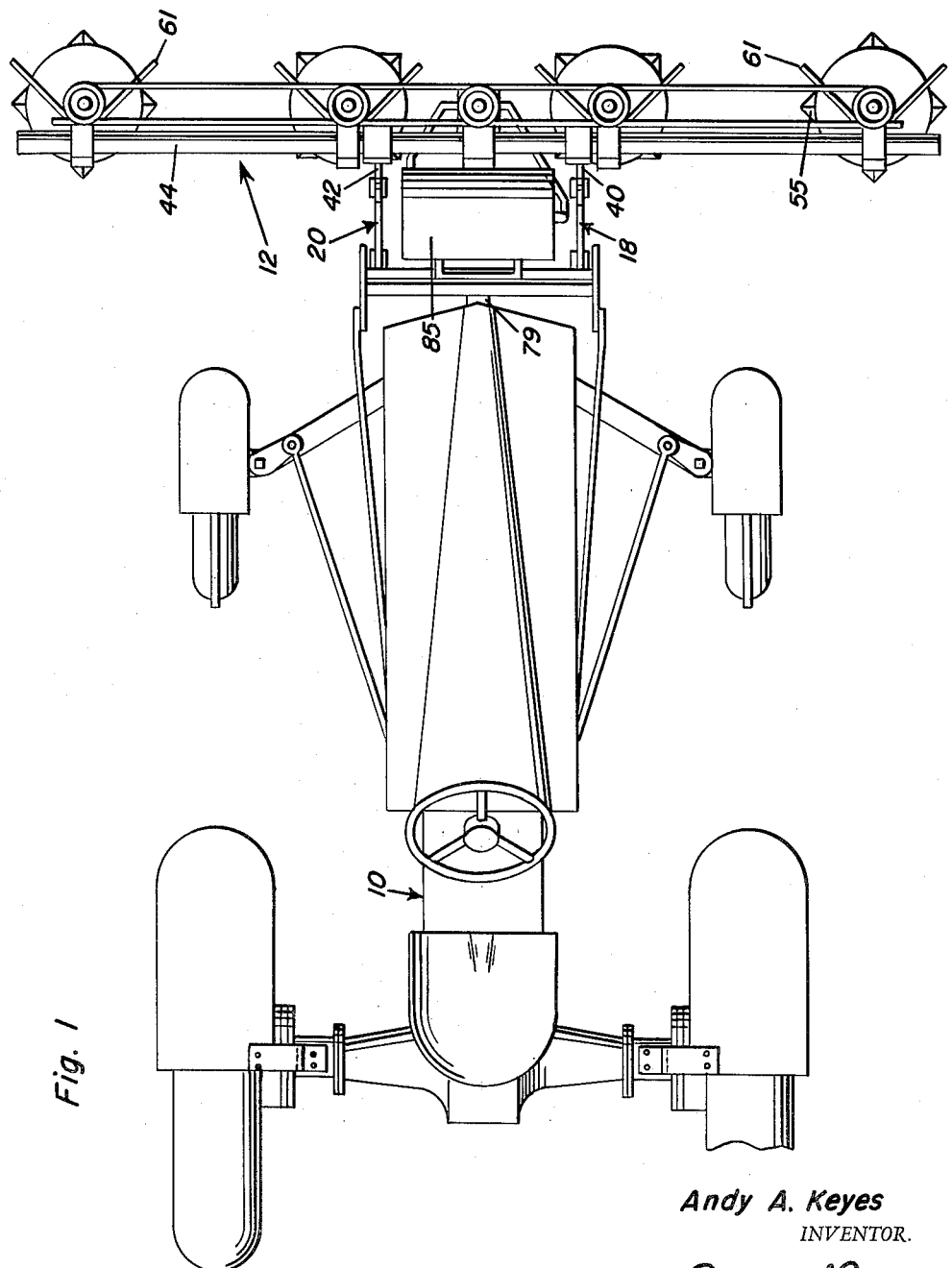
FIGURE 1 is a top view of a tractor equipped with an attachment in accordance with the invention.

In the accompanying drawings there is illustrated a conventional tractor 10 diagrammatically representing any manufacturer's make of tractor capable of supporting and using attachment 12. The principles of the invention are embodied in the cotton topping attachment 12 mounted at the front of the tractor 10.

Attachment 12 includes an essentially rectangular frame 14 mounted at the front of the tractor, for instance by being secured to the front tractor drawbar, mechanically bolted in place and supported by braces 16 or otherwise fastened. The fastening of frame 14 will, of course, varying accordance with the different manufacturer's makes of tractors that are involved. There are two linkages 18 and 20 connected with the sides of frame 14, and each is identical. Linkage 18 is made of a fixed link 22 composed of a pair of closely spaced plates welded or otherwise secured to one side of frame 14. Two movable, parallel links 24 and 26 are connected by pivot pins 28 to the upper and lower parts of the fixed link 22, fitting between the plates thereof. A front movable link 30 is pivoted by pivot pins 32 to the front ends of movable links 24 and 26. A portion of movable link 30 depends downwardly below the pivot 32 connecting it with movable link 26. As shown in FIGURE 2 the linkage 18 is actually a parallelogram linkage, and it is held in a selected adjusted position by means of the chain 34 engaged in a clevis 36 attached to movable link 24 and engaged in an opening in upper brace 17 that is connected to frame 14.

Mounting bracket assembly 40 projects forwardly at the lower end of movable link 30, has a companion identical bracket assembly 42 at the front part of linkage 20, and both of these bracket assemblies are secured to a transverse beam 44 of indefinite length. The link 30 of each of the linkages 18 and 20 comprises two parallel link elements which are arranged in pairs on each side of the links 24 and 26 and the inner end of bracket assembly 40. They are connected by pins 32 to links 24 and 26, and are fixed to bracket 40. A practical length would be that capable of treating four rows of cotton (FIGURE 1).

There are four cutters or blades 50, 51, 52 and 53 indirectly supported by beam 44, and each cutter is made of a disk having a plurality of radial teeth 55 protruding outwardly from the periphery thereof. Typical blade 50 (FIGURE 2) is secured to a vertical spindle 56, and this is mounted for rotation in a pair of thrust bearings 57 and 58 that are secured to bearing plate 59. The bearing plate is mechanically connected, for instance by a split clamp 62, to beam 44. Each blade together with its supporting spindle and means by which to mount that spindle for rotation on beam 44, are spaced along the length of beam 44, and V guides 61 are secured to plates 59 above each blade. The V-guides are merely horizontally extending rods for guiding the cotton plants into the cutters.

All of the spindles supporting the cutters are mounted for simultaneous rotation. This may be achieved by a belt and pulley transmission because of its practicability. The outboard spindles are equipped with single pulleys 63 and 64 (FIGURE 3) around which belts 65 and 66 are entrained. The inboard spindles, however, have double pulleys 67 and 68 thereon around which belts 65 and 66 are entrained together with belts 69 and 70. Belts 69 and 70 are engaged with double pulley 72 on the power output shaft 73 of hydraulic motor 74.

The hydraulic motor is operated by a hydraulic power system 78 which obtains power from the engine of the tractor 10. The crank shaft of the tractor engine has an extension 79 coupled thereto (FIGURE 2), and this is also coupled to a hydraulic pump 80. The pump is mechanically supported on frame 14 by means of a bracket assembly 83. Tank 85 having a conventional vent cap (not shown) at the top thereof, is secured to frame 14 near the top thereof, and the hydraulic lines for the system 78 are connected with the tank, the pump 80 and hydraulic motor 74. Specifically, pump 80 has inlet line 87 extending from tank 85 to the inlet port thereof, and there is a line 89 extending from the pump outlet to the motor 74. The line 90 extending from the hydraulic motor 74 returns to the tank 85, and there is a manual bypass valve 91 connected in bypass line 92 extending from tank 85 to valve 91 and thence to the hydraulic pump 80.

In use and operation, attachment 12 is installed on a tractor by securing the frame 14 in place at the front of the tractor. The height of the beam 44 is adjusted and held by chain 34, and after a power connection between the tractor and the fluid pump 80 is made, the attachment is ready for operation.

As the tractor is moved through a field, the rotary blades top the cotton, the blades being set into continual rotary movement by the belt transmission, and this, in turn, is powered by the hydraulic system of the attachment which is separate and apart from other mechanical, hydraulic or electrical systems of the tractor.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A cotton topper attachment for a tractor, said attachment comprising a frame adapted to be fastened to the front of the tractor, a transverse beam, mechanical means including a chain adjustably securing said beam to said frame so that the elevation of the beam is adjustable, a plurality of substantially vertical spindles, means securing said spindles for rotary movement about their axes on said beam at laterally spaced places, blades secured to said spindles to top the cotton, and means connecting said spindles and for rotating said spindles thereby rotating said blades, said spindles connecting and rotating means including a separate belt operatively connecting each adjacent spindle, a hydraulic fluid motor system centrally carried by said frame and drivingly connected with two adjacent spindles on each side thereof by a separate belt.

2. In a cotton topper attachment for a tractor, a frame, parallelogram linkages connected with said frame, a horizontal beam circular in cross-section to which said linkages are secured and thereby supporting said beam for vertical adjustment, means to hold said beam in selected adjusted positions, a plurality of cutters, means mounting said cutters on said beam for rotary movement about a substantially vertical axis, means operatively connected with said cutter mounting means for rotating said cutter mounting means and thereby operating the blades of the cutter, the last mentioned means including a hydraulic system adapted to be operatively driven by power from the tractor, the cutter mounting means including a support for each cutter rotatably adjustable about said beam.

3. A device as recited in claim 2 wherein each support further includes a vertical plate fixed to a C-clamp which frictionally grips said beam, two vertically spaced bearings on the plate and projecting from the forward face thereof, a cutter spindle mounted in the bearings having one of said blades fixed to its lower end and a drive pulley fixed to its upper end and V-guides fixed to the plate and projecting forwardly therefrom.

References Cited in the file of this patent

UNITED STATES PATENTS

| | | |
|---|---|---|
| 2,505,952 | Fergason | May 2, 1950 |
| 2,578,963 | Bell | Dec. 18, 1951 |
| 2,732,675 | Smith et al. | Jan. 31, 1956 |
| 2,743,567 | Martin | May 1, 1956 |
| 2,842,926 | Nelson | July 15, 1958 |